United States Patent [19]

Rosenberg

[11] 3,782,083
[45] Jan. 1, 1974

[54] DISPOSABLE GAS FILTER
[75] Inventor: David J. Rosenberg, Glen Cove, N.Y.
[73] Assignee: Pall Corporation, Glen Cove, N.Y.
[22] Filed: Sept. 16, 1971
[21] Appl. No.: 181,123

[52] U.S. Cl.............. 55/491, 55/501, 55/502, 55/521, 210/445, 210/DIG. 23
[51] Int. Cl............................................. B01d 39/08
[58] Field of Search............ 55/279, 159, 501-502, 55/514, 491, 521; 210/DIG. 23, 445, 446

[56] References Cited
UNITED STATES PATENTS

| | | | |
|---|---|---|---|
| 3,686,835 | 8/1972 | Strange et al.................. | 210/445 X |
| 3,520,416 | 7/1970 | Keedwell.......................... | 55/524 X |
| 2,980,204 | 4/1961 | Jordan.............................. | 55/501 X |
| 3,076,303 | 2/1963 | Durbeloh........................ | 55/501 UX |
| 3,002,870 | 10/1961 | Belgrade et al................ | 55/502 UX |
| 3,693,410 | 9/1972 | Robrecht et al................ | 55/510 X |
| 2,192,968 | 3/1940 | Fieser............................... | 55/511 X |
| 3,631,654 | 1/1972 | Riely................................ | 55/159 |
| 604,931 | 5/1898 | Eisendrath....................... | 210/445 |
| 3,183,285 | 5/1965 | Boylan............................. | 55/490 X |
| 3,563,828 | 2/1971 | Marshall......................... | 55/528 X |
| 3,552,103 | 1/1971 | Smith............................... | 55/511 X |
| 3,154,393 | 10/1964 | Klein et al...................... | 55/514 X |
| 3,295,297 | 1/1967 | Collins............................. | 55/178 |
| 3,471,019 | 10/1969 | Trasen et al.................... | 210/445 |

Primary Examiner—Frank W. Lutter
Assistant Examiner—Vincent Gifford
Attorney—Janes & Chapman

[57] ABSTRACT

A disposable filter is provided that is especially suited for filtering gases, and for manufacture in a small size, comprising a housing in at least two portions defining therewith a fluid chamber with two fluid ports, and a filter element in sheet form extending across the fluid chamber and held at its sides to one housing portion across the line of flow between the fluid ports, the housing portions being bonded together and the filter element being bonded to one housing portion in a fluid-tight and microorganism-tight seal.

9 Claims, 4 Drawing Figures

PATENTED JAN 1 1974  3,782,083

3,782,083

DISPOSABLE GAS FILTER

It is quite important in medical applications that a filter be capable of being made absolutely sterile before use. To avoid the necessity of complex cleaning and sterilizing operations after use, it is also desirable that the filter be disposable. The design of a filter element that is both sufficiently inexpensive to be disposable and capable of being autoclaved for a sufficiently long time to render it absolutely sterile throughout without effect upon the tightness of the fluid seals or distorting the fluid line connections or changing the pore size of the filter element is quite a challenge that is not readily met. The design must, for example, be susceptible of mass quantity production at low cost, and be relatively foolproof from the standpoint of obtaining reliably fluid-tight and microorganism-tight seals. It is particularly important that these requirements be fully met in the case of filters for use in the filtration of gases for administration of oxygen to a patient in oxygen resuscitation.

Also of considerable importance, although not a matter of necessity, is that the filter element be of a high flow capacity at a low pressure drop in a small compact size. This reduces cost, as well as simplifying installation and use. It also makes it possible to reduce weight to a minimum.

As a result of these requirements, it is not feasible to manufacture such filters, and particularly the housing, of metal, partly because the cost of metals is rather high, and partly because metals are more difficult and more costly to fabricate than other materials, particularly plastic, and especially when the filter assembly is to be of a small size. However, when plastic is used, it is quite difficult to fabricate the filter in a manner such that the filter element will be securely and reliably sealed in the housing without any possibility of leakage of fluids, or of microorganisms by passing the filter, and that the filter can be autoclaved in the course of sterilization procedures without developing leaks. Moreover, the sealing of the filter element within a housing presents special problems, due to the difficulty of access to the filter element in the housing while the bonding and sealing operations are carried out.

In consequence, disposable filter elements have been fabricated of plastic, but the filter elements have been made in a tubular configuration, with the tube ends closed off by end caps, because such a complete filter structure with access past the filter element being blocked by the end caps can be fabricated separately, and can be easily sealed at the end caps in a plastic housing in a leak-tight manner in which the seals are accessible from the outside during assembly. However, such a structure is relatively costly because at least two operations — formation of the filter element, and sealing the element on the housing — are necessary, and a third operation — fabrication of the housing and sealing that separately — may also be required. Besides that, tubular filter elements cannot be made in a very small size, because of the difficulty of handling the parts, and this necessarily means that such filters have had to be of a larger size than would be required, particularly for medical use. However, to enclose a sheet filter directly and inexpensively in sheet form in a housing in a leak-tight manner has defied design, and such filters, if made, have not been sufficiently inexpensive or reliably sealed or small enough to be either disposable or suitable for medical applications.

It has also been proposed that a disposable filter assembly be made with the housing in two portions, and the filter element held at its sides in the bite of the two housing portions, which are joined together by way of the through pores of the filter element, either by a bonding agent or by fused integration of the housing portions. This however leads to a weak seal that is not capable of withstanding high internal pressures, such as the 80 psi or higher that can be encountered in pressure gas lines, for instance, oxygen lines in hospitals, since the seal is limited to the open volume of the filter at the peripheral portions joined to the housing. The housing portions can be so weakly bonded as to be susceptible of being pried off by careless workers during use or installation.

In accordance with the invention, a disposable filter assembly is provided, having at least two housing portions, and the filter element in sheet form is impaled at its sides upon a mounting member projecting from an internal wall of one housing portion, and is thereby bonded in place to the housing by integration with the mounting member impregnating the through pores of the filter element at such side portions thereof. The design of the mounting member on the housing portion ensures a fluid-tight seal between the housing portion and all sides of the filter element, so as to preclude any possibility of leakage past the filter element within the housing, even at internal pressures of 160 psi and higher. The design lends itself to the use of plastic in all parts of the filter assembly, optionally including even the filter element itself, and also makes it possible to integrate the component parts of the disposable filter assembly, which can be a minimum of three, into as few as one piece. The filter assembly can be made in mass production, in large quantities, at low cost, so that the assembly can be considered as truly disposable after one use.

The disposable filter assembly in accordance with the invention comprises, in combination, a housing having at least two ports and composed of at least first and second housing portions defining therebetween a fluid chamber, the opposed sides of the first and second housing portions having mating sections abutting and bonded in a fluid-tight seal to each other, and one of the housing portions having on an internal wall a projecting mounting member, and a filter element in sheet form extending across the fluid chamber and across the line of fluid flow between the fluid ports and held at all of its side portions upon the mounting member which impregnates and seals through pores of the filter element in such side portions, and thereby integratingly retains the filter element to such housing portion, the housing portion positioning the filter element across the fluid chamber, and sealing all the sides of the filter element so that the fluid flow between the fluid ports must pass through the filter element.

In a preferred embodiment, the mating sections of the first and second housing portions are integrated in a fluid-tight seal.

In the preferred embodiment, the disposable filter assembly is in a generally spherical shape. However, any type of box shape can be used, including, for example, box cubes, according to the size and edge configuration of the filter sheet. These are of course determined by the needed flow and dirt capacity for the filter assembly.

The first and second housing portions are generally cup-, bell- or bowl-shaped and have mating side portions. In assembling the filter assembly, the filter sheet can be fitted over the projecting mounting member across the open center of the housing portion, and integrated thereto in a fluid-tight seal. The other housing portion is then placed in abutting relationship over the mating sides of the filter-bearing housing portion, and the housing portions bonded together at their mating sides. All sides of the filter element are sealed to the housing at the housing portion, so that all fluid flow between the fluid ports must pass through the filter element.

A preferred embodiment of the invention is shown in the drawings, in which.

Figure 1:
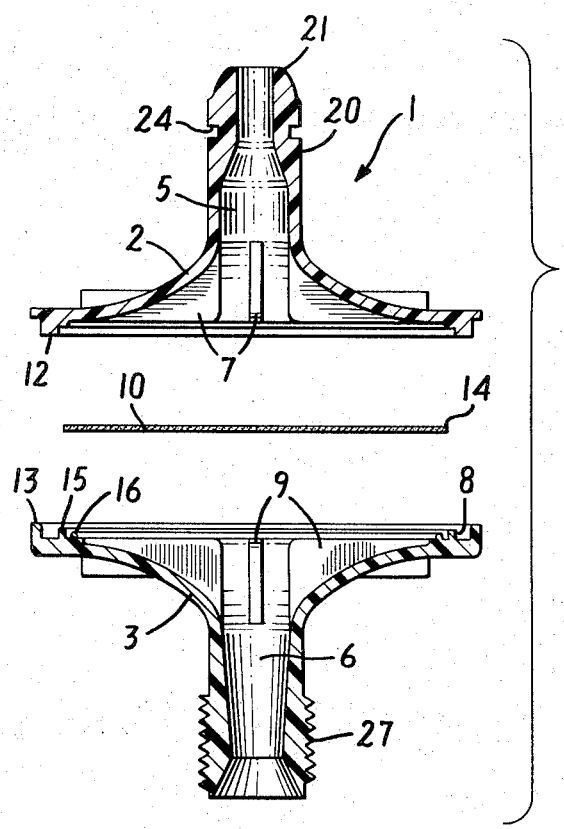
FIG. 1 represents an exploded view of a filter assembly in accordance with the invention, showing the component parts prior to assembly, including the two housing portions and the filter element in sheet form.
Figure 2:
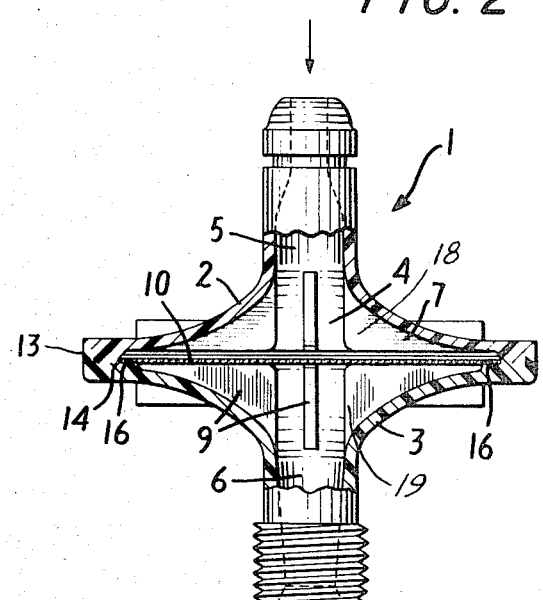
FIG. 2 represents a side view, partly in section, of the filter assembly of FIG. 1.
Figure 4:
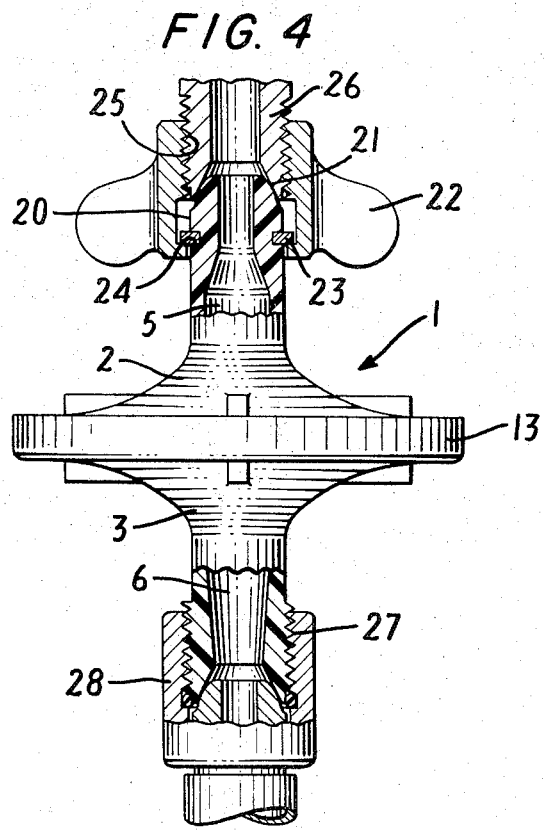
FIG. 4 represents a side view, partly in ection, of the filter assembly of FIG. 1 attached to a gas pressure line.
Figure 3:
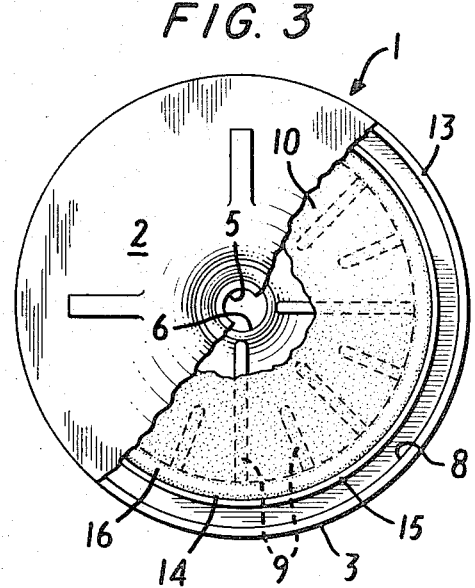
FIG. 3 represents a top view, partly in section, of the filter assembly of FIG. 1.

The filter assembly of FIGS. 1 to 4 is composed of a housing 1 having first and second generally bell-shaped housing portions 2 and 3 of polypropylene defining a fluid chamber 4 therewithin. A fluid port 5 is at the base of housing portion 2, and a fluid port 6 is at the base of housing portion 3. It will be seen that these ports are coaxial; one port serves as a fluid inlet and the other as a fluid outlet. Fluid flow can be from either direction, if the element 10 is a sheet whose opposite sides are the same, but usually and preferably flow is from port 5 as inlet to port 6 as outlet. Housing portion 2 has a plurality of internal projections 7 or ribs extending from the periphery to the center of the housing portion 2, and housing portion 3 has a plurality of like internal projections 9 or ribs extending from the periphery to the center of the housing portion 3. These serve as supports at each side of and across the center of the circular filter sheet 10 serving as the filter element. Each of first and second housing portions 2 and 3 is circular in configuration, and generally bell-shaped.

Extending outwardly from the interior of the sides of the housing portion 2 at a short distance inwardly from the edge thereof is the tongue side portion 12. Extending outwardly from the sides of housing portion 3 is side portion 13 which is flush with the edges thereof, and defines with projecting concentric ridge 15 a peripheral groove 8 into which the side portion 12 fits snugly in a press fit. Inward of ridge 15 is a concentric projecting mounting member 16 whose height is slightly greater than the thickness of the filter sheet 10, which fits within the ridge 15 of the housing portion 3. The peripheral side portions 14 of the filter sheet 10 are impaled upon and integrated with the mounting member 16 and held firmly thereto in a fluid-tight and microorganism-tight seal, by fused integration of the member 16 through the pores of the filter sheet 10. Such a bond can be obtained, for example, by ultrasonic welding, by solvent-softening, or by heat-fusion. External leakage from the housing 1 is prevented by the seal between portions 2 and 3 via the tongue and groove joint 13, 12, 8, 15. Such a bond can be obtained by spin welding, or by ultrasonic welding, by solvent softening, or by heat fusion of the housing portions there. Thus, the housing is in one piece, with the filter element integrated and sealed to housing portion 3 by the integral bond with member 16.

The filter element 10 can be of any filter sheet material. The element shown is made of paper having a microporous fibrous layer thereon and bonded thereto prepared in accordance with U.S. pat. No. 3,573,158, dated Mar. 30, 1971, to Pall et al., Example 6. However, wire mesh, such as stainless steel wire mesh, or epoxy-impregnated paper, as well as other types of sheet filter elements, can also be used.

The filter element 10 can also be made in corrugated form, for an increased surface area in the limited space of the fluid chamber, in which event the tips of the corrugations abut and are held in place within the chamber by the projections 7 and 9 of the housing portions 2 and 3. In this case, it is simpler to make the filter element in a square sheet, and the housing as a squared cube, to facilitate sealing of the four sides of the sheet between the housing portions and still maintain the corrugations. A circular or disc filter sheet can also be corrugated. In any case, the corrugations must be pressed out at the periphery, for good sealing.

The edges 14 of the sheet 10 run right to the interior wall of the ridge 15 of the housing portion 3.

The assembly of the filter shown in FIGS. 1 to 4 is as follows.

It will be seen on reference to FIG. 1 that the side 12 of the housing portion 2 fits snugly in the groove 8 between the side 13 and ridge 15 of the housing portion 3. Since the housing portions 2 and 3 are each round, they can be fitted snugly together and spun welded to integrate them in one piece.

The member 16 is slightly longer than the thickness of the filter 10, thus providing excess material to spread into the pores of the element during integration thereof through the pores of the filter element.

In assembly, the edges 14 of the disc filter 10 are folded around the projecting member 16 of the housing portion 3, with the edges closely abutting the recess just inside the ridge 15. The filter 10 will remain in place while the member 16 is fused by ultrasonic welding, heat or solvent, the plastic material running through the pores of the filter element and forming a fluid-tight integral seal therebetween, closing off all sides of the filter element to fluid flow. Then, the housing portion 2 is fitted over the portion 3, and pressed down smartly. The tongue and groove members can then be bonded by fusion, such as by spin welding, ultrasonic welding, heat fusion or solvent softening, sealing the housing portions 2, 3, together, and preventing fluid leakage to the outside of the filter assembly, as well as passage of microorganisms. The filter assembly is now complete and ready for use.

The filter assembly is operated in-line, as follows. Fluid flow can be in either direction, but usually fluid enters at the port 5, runs into the chamber portion 18, and then flows through the filter 10, into the chamber portion 19, whence it emerges from the housing 1 via port 6.

Line connections can be made at ports 5, 6 in any desired manner. For medical use, Luer-loks can be used. However, the filter assembly of FIGS. 1 to 4 is especially designed for use at a high pressure mounted on to oxygen line top, and is shown so mounted in FIG. 4. For this purpose, the inlet port fitting 20 has a rounded tip 21 and a wing nut 22 which is rotatably mounted on the fitting 20 and is retained thereon via the retaining ring 23 in groove 24 of the fitting. The wing nut has internal threads 25 and threads over the oxygen line end 26 to the washer 23, and seals thereto via the rounded tip 21.

The other port 6 has external threads 27 which receive a conventional gas line connector 28 normally attachable to the gas line end 26. Thus, the filter mounts in-line. Gas from the line 26 thus must pass through the filter to reach the line connection 28, whence it is delivered, say, to oxygen inhalation thereapy apparatus.

The filter housing can be made of any synthetic plastic material. Thermoplastic or solvent-soluble plastic materials are preferred because of the ease of bonding, but it is also possible to use thermosetting resins in a thermoplastic, fusible, or heat-softenable stage of polymerization until the bonding of the sides of the housing portions to the filter has been effected, after which the curing of the resin can be completed, to produce a structure which can no longer be separated. Such a structure is autoclavable without danger of destroying the fluid-tight seals between the housing portions and the filter element. Thermoplastic resins whose softening point is sufficiently high so that they are not softened under sterilizing autoclaving conditions are preferred for medical use. Exemplary of the plastic materials which can be used are polyethylene, polypropylene, polybutylene, polyisobutylene, polyamides, polyvinyl chloride, polyvinylidene chloride, polyacrylonitrile, polyesters, polycarbonates, polymethyl methacrylate, polyallyl and polyoxymethylene resins. Polytetrafluoroethylene and polytrifluorochloroethylene also can be used.

A filter sheet of any pore size can be used, but it is usually preferred for medical purposes that the pore size of the filter element be less than 50 microns, and preferably less than 0.3 micron if the passage of microorganisms through the filter is to be prevented. Filter sheets which are incapable of passing microorganisms such as bacteria include membrane filters and the filter sheets described in U.S. Pats. Nos. 3,238,056, dated Mar. 1, 1966; 3,246,767, dated Apr. 19, 1966; 3,353,682, dated Nov. 21, 1967; and 3,573,158, dated Mar. 30, 1971, all to Pall et al.

Also useful are metallic filter sheet materials such as the woven or nonwoven wire mesh, for instance, stainless steel screen and stainless steel wire mats. Metal filter sheets are readily bonded to plastic housing materials in a fluid-tight seal, by fusion or potting techniques.

The disposable filter assemblies of the invention can be in any circumferential configuration, conforming to the circumferential configuration of the filter sheet that is desired. The filter sheet is preferably round, but it can also be square or rectangular, and in fact, any straight- or irregular-sided polygonal shape, including triangular, hexagonal, pentagonal, octagonal, oval, elliptical, and free-form circular configurations, according to taste and space requirements. It may be desirable to provide interlocking groove-and-tongue members on the separate housing portions, to ensure proper and snug alignment of the housing portions before sealing.

The disposable filter assemblies of the invention have wide medical uses, and can be used, for example, in the filtration of blood in blood transfusions, in extracorporeal transfusion operations, and in the filtration of gases. They are particularly adapted to the manufacture of disposable filter assemblies in very small size and internal volume, useful in the filtering of gases of all sorts to a patient, such as, for example, an oxygen filter in oxygen administration, or as a breathing filter, in oxygen inhalation therapy apparatus, or in administering anaesthetic gases plus oxygen, or in the oxygen line to the nebulizer in air breathing machines.

I claim:

1. A disposable filter assembly comprising, in combination, a housing having at least two fluid ports and composed of at least first and second housing portions of thermoplastic resin material defining therebetween a fluid chamber, the first and second housing portions having opposed sides with peripheral mating sections abutting and defining a tongue-and-groove joint, permanently bonded to each other in a fluid-tight seal; and one of the housing portions having on an internal wall, spaced from the mating section on such housing portion, a projecting mounting member; and a filter element in sheet form having a pore size of less than 50 microns and extending across the fluid chamber across the line of fluid flow between the fluid ports, and held at its peripheral side portions upon the mounting member; the filter element having through pores extending from one face thereof to another face, and the mounting member impregnating such through pores of the filter element at such side portions and thereby integratingly retaining the filter element to such housing portion, the mounting member of the housing portion positioning the filter element across the fluid chamber, and by such impregnation of through pores at the periphery of the filter element sealing all sides of the filter element so that fluid flow between the fluid ports must pass through the filter element, the mating sections of each housing portion comprising projecting members engaging and supporting the opposite surfaces of the filter element therebetween.

2. A disposable filter assembly in accordance with claim 1, in which the housing portions in cross section are in a circular configuration, with the filter element in circular sheet form.

3. A disposable filter assembly in accordane with claim 1, in which the first and second housing portions and the fluid ports therein are arranged so that the fluid ports are coaxial.

4. A disposable filter assembly in accordance with claim 1, in which the filter element has a pore size of less than 0.3 micron.

5. A disposable filter assembly in accordance with claim 1, in which the thermoplastic resin material is a thermosetting resin in a thermoplastic stage of polymerization.

6. A disposable filter assembly in accordance with claim 1, in which the thermoplastic resin material is a thermoplastic resin.

7. A disposable filter assembly in accordance with claim 6, in which the thermoplastic resin is polypropylene.

8. A disposable filter assembly in accordance with claim 1, in which the housing portions are integrated together at the mating sections to form a one-piece housing.

9. A disposable filter assembly in accordance with claim 1, in which the housing portions are circular in cross section, and the projecting members are arranged radially.

* * * * *